(12) United States Patent
Malavasi

(10) Patent No.: US 12,398,810 B2
(45) Date of Patent: Aug. 26, 2025

(54) ENERGY RECOVERY VALVE SYSTEM WITH SPHERICAL SEGMENT VALVE FOR CONTROLLING THE FLUID FLOW IN A DUCT

(71) Applicant: Politecnico di Milano, Milan (IT)

(72) Inventor: Stefano Malavasi, Milan (IT)

(73) Assignee: Politecnico Di Milano, Milan (IT)

( * ) Notice: Subject to any disclaimer, the term of this patent is extended or adjusted under 35 U.S.C. 154(b) by 92 days.

(21) Appl. No.: 18/002,718

(22) PCT Filed: Jun. 18, 2021

(86) PCT No.: PCT/IB2021/055385
§ 371 (c)(1),
(2) Date: Dec. 21, 2022

(87) PCT Pub. No.: WO2021/260508
PCT Pub. Date: Dec. 30, 2021

(65) Prior Publication Data
US 2023/0341058 A1    Oct. 26, 2023

(30) Foreign Application Priority Data
Jun. 23, 2020    (IT) .......................... 102020000014983

(51) Int. Cl.
*F16K 5/06*    (2006.01)
*F16K 47/04*    (2006.01)

(52) U.S. Cl.
CPC .............. *F16K 5/0605* (2013.01); *F16K 5/06* (2013.01); *F16K 47/04* (2013.01)

(58) Field of Classification Search
CPC ........... F16K 5/0605; F16K 5/06; F16K 47/04
See application file for complete search history.

(56) References Cited

U.S. PATENT DOCUMENTS 4,540,025 A * 9/1985 Ledeen ................. F16K 47/045
251/127
5,016,857 A * 5/1991 Bovee ................... F16K 5/0605
251/304

(Continued)

FOREIGN PATENT DOCUMENTS

KR    102 088 879 B1    3/2020
WO    2013/121375 A1    8/2013

OTHER PUBLICATIONS

International Search Report and Written Opinion dated Sep. 13, 2021, issued in PCT Application No. PCT/IB2021/055385, filed Jun. 18, 2021.

*Primary Examiner* — Craig M Schneider
*Assistant Examiner* — Christopher D Ballman
(74) *Attorney, Agent, or Firm* — Workman Nydegger

(57) ABSTRACT

A valve system includes a hollow valve body provided with an inlet and an outlet which allow a flow of a fluid in the valve body; the valve body housing an obstructer rotatable, about a rotation axis, between a first position, in which the obstructer stops the passage of fluid between the inlet and the outlet, and a second position, in which the obstructer allows a passage of fluid between the inlet and the outlet. The valve system provides for rotation of the obstructer between the first position and the second position. A rotor is placed inside the valve body and is provided with a rotation shaft. The valve body also includes a housing having a recess with a spherical segment configuration on a lateral portion of the valve body, in which the obstructer is at least partially housed in the second position.

13 Claims, 6 Drawing Sheets

(56) References Cited

U.S. PATENT DOCUMENTS

| | | | | |
|---|---|---|---|---|
| 5,251,815 | A * | 10/1993 | Foye | F24F 13/06 |
| | | | | 236/51 |
| 5,406,979 | A * | 4/1995 | McHugh | A62C 35/68 |
| | | | | 137/557 |
| 6,029,702 | A * | 2/2000 | Leinen | F16K 47/045 |
| | | | | 251/121 |
| 6,520,209 | B1 * | 2/2003 | Lundqvist | F16K 47/045 |
| | | | | 251/127 |
| 7,044,436 | B2 * | 5/2006 | Corbetta | F16K 47/045 |
| | | | | 251/315.01 |
| 8,156,801 | B2 * | 4/2012 | Gabard-Cuoq | G01F 1/10 |
| | | | | 251/315.16 |
| 8,678,778 | B2 * | 3/2014 | Bosbach | F16K 5/10 |
| | | | | 417/423.1 |
| 9,599,252 | B2 * | 3/2017 | Malavasi | F16K 47/045 |
| 11,747,835 | B2 * | 9/2023 | Ham | G05D 7/0635 |
| | | | | 137/561 R |
| 2014/0346776 | A1 | 11/2014 | Hum | |
| 2015/0041002 | A1 * | 2/2015 | Malavasi | F16K 5/0605 |
| | | | | 137/560 |
| 2022/0317709 | A1 | 10/2022 | Hwan | |

\* cited by examiner

ENERGY RECOVERY VALVE SYSTEM WITH SPHERICAL SEGMENT VALVE FOR CONTROLLING THE FLUID FLOW IN A DUCT

FIELD OF THE INVENTION

The present invention relates to an energy recovery valve system with spherical segment valve for controlling the fluid flow in a duct.

BACKGROUND ART

Devices called "ball valves" are known which are used as shut-off devices in ducts, typically pressurized ones.

Ball valves allow for selectively closing the duct with which they are associated, so as to prevent a fluid, such as a gas, a liquid or steam, from flowing therein. For this purpose, the ball valves known in the art comprise an obstructer with a substantially spherical shape, housed in a suitable seat and having a substantially cylindrical through hole.

The spherical obstructer of the ball valves known in the art can be oriented with its through hole coaxial to the flow, thus allowing the fluid to flow through the valve; the spherical obstructer can also be oriented perpendicularly to the direction coaxial to the duct. The spherical obstructer of a ball valve can be selectively rotated, typically by an angle of 0° to 90°, by means of a suitable actuator, such as a knob operable by a user.

The ball valves known in the art permit adjusting the fluid flow in a duct, in which the valve has been inserted, by rotating the obstructer by an angle smaller than 90°, so as to obstruct only a part of the free cross-section of the duct. In this manner, the flow through the ball valve is reduced, but not completely prevented.

The flow adjustment effectiveness of the ball valves known in the art is nevertheless poor. The adjustment of the flow through the valve is inaccurate, and it is difficult to precisely determine the quantity of gas or liquid actually flowing through a partially closed ball valve. Also, a known ball valve, when partially closed in order to adjust the flow of a fluid, introduces huge local energy dissipations within the fluid itself. Such dissipations lead to a reduction in the average velocity of the fluid, resulting in a reduced flow rate, but they typically bring no energetic benefit to the system in which the ball valve is inserted.

International patent application WO2013/121375-A1 by the present Applicant describes, with reference to claim 1, a fluid flow control valve comprising a housing and a spherical obstructer comprising a through hole, wherein said spherical obstructer is inserted in said housing and is adapted to rotate therein about an axis of rotation between a first position, in which said through hole is substantially coaxial to said control valve to allow the passage of a fluid, and a second position, in which said through hole is substantially transversal to said control valve to prevent the passage of a fluid, characterized in that said control valve further comprises a rotor within said through hole, wherein said rotor is adapted to rotate in a continuous manner under the action of a fluid flowing through said control valve, rotating about a second axis of rotation substantially coinciding with said axis of rotation of said spherical obstructer.

The spherical obstructer comprises two diametrically opposite spherical-segment parts, and a central hole through which the fluid can flow when the valve is partially or totally open.

This known control valve permits recovering, due to the presence of the rotor, part of the energy that common control valves dissipate during their control action, and allows solving the problems set forth in said application. However, there is still room for improvement, and a few additional technical problems should be solved, in particular in order to broaden the field of use and application through improved behaviour and efficiency, e.g. for compressible fluids, while further reducing the manufacturing costs.

SUMMARY OF THE INVENTION

It is therefore an object of the present invention to propose an energy recovery valve system with spherical segment valve for controlling the fluid flow in a duct, which represents an improvement over the prior art.

The present invention relates to a valve system for controlling the fluid flow in a duct, which comprises a hemispherical or, more generally, spherical-segment obstructer, and a rotor shaped substantially as a turbine, which permits recovering part of the energy that prior-art control valves dissipate during their control action, and that would otherwise be dissipated and lost.

Preferably, the axes of rotation of the obstructer and of the rotor overlap.

Preferably, a deflector is also provided upstream of the valve system.

Unlike the system described in the above-mentioned international patent application WO2013/121375-A1, the valve system according to the present invention does not use a spherical obstructer, but rather a hemispherical obstructer or, more generally, a spherical-segment obstructer.

This difference brings substantial advantages, especially for a number of applications that require different characteristic curves of the flow coefficient of the control valve; moreover, this type of obstructer (hemispherical or spherical-segment type) gives the possibility of expanding the flow downstream of the obstructer, which is indispensable for working with compressible fluids.

The use of a hemispherical or, more generally, spherical-segment obstructer reduces the torques required for moving the obstructer, so that smaller and less expensive actuators can be employed.

Moreover, the valve system of the present invention ensures accurate control of the fluid flow, in particular also in partially open conditions.

The present invention concerns a valve system for controlling the fluid flow in a duct, comprising:

a valve body adapted to be inserted in an interruption of said duct, and provided with an inlet and an outlet for a flow of fluid in said duct, said valve body comprising a housing shaped substantially as a spherical segment upstream of the valve system with respect to the fluid flow on the side of said inlet, and a part opposite to said housing on the side of said outlet, an obstructer, placed inside said housing only upstream of the valve system with respect to the fluid flow, said obstructer having an axis of rotation and a spherical-segment outer contour, adapted to adhere to the spherical segment of said housing, actuation means adapted to rotate said obstructer from a first position, in which said duct is fully open, to a second position, in which said duct is fully closed, a rotor shaped substantially as a turbine, placed inside the valve body and provided with a rotation shaft substantially superposed on or parallel to the axis of rotation of the obstructer, said rotor being adapted to be rotated by said fluid flow.

It is a particular object of the present invention to provide an energy recovery valve system with spherical segment valve for controlling the fluid flow in a duct as set out in the claims, which are an integral part of the present description.

BRIEF DESCRIPTION OF THE DRAWINGS

Further objects and advantages of the present invention will become apparent from the following detailed description of an exemplary embodiment (and variants thereof) provided herein with reference to the annexed drawings, which are only supplied by way of non-limiting example, wherein.

In the drawings, the same reference numerals and letters identify the same items or components.

DETAILED DESCRIPTION OF SOME EMBODIMENTS

Figure 1:
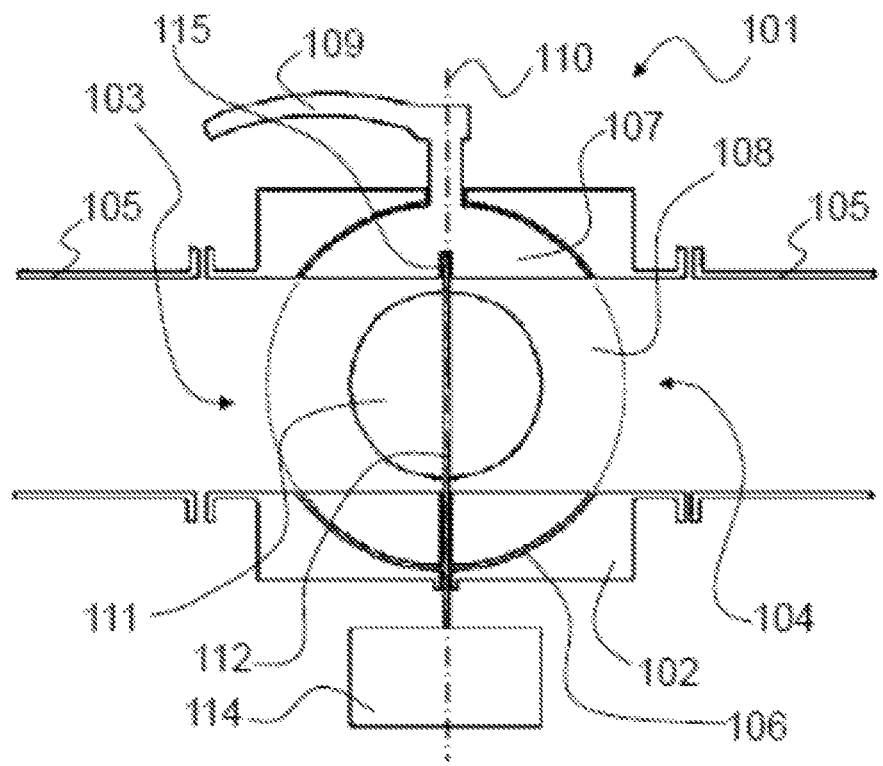
FIG. 1 schematically shows a sectional side view of a first embodiment of the valve system according to the present invention.

FIG. 1 shows a schematic view of a valve system 101 according to the present invention. The valve system 101 comprises a substantially hollow valve body 102 provided with an inlet 103 and an outlet 104, which allow a fluid to flow in a duct 105. In operating conditions, the valve 101 can be mounted at a suitable interruption of the duct 105 included, for example, in a pressurized system.

The valve 101 comprises components that make it essentially a "spherical segment" valve. In fact, it comprises a housing 106 shaped substantially as a spherical segment that internally accommodates an obstructer 107, which, when the valve is rotated, allows closing the valve 101 to stop the fluid flow between the inlet 103 and the outlet 104, or partially or totally opening the valve to allow the fluid to flow.

As more clearly visible in FIGS. 3-8, the obstructer 107 has a substantially hemispherical shape or, more generally, is shaped as a spherical segment, and comprises a through aperture 108, the axis of which can be rotated into different positions.

For the valve system to operate correctly, the hemispherical or spherical-segment part 107 of the obstructer is placed only upstream of the valve system with respect to the fluid flow. The part of the valve body that comprises said outlet (104) downstream of the fluid flow is empty.

Figure 3:
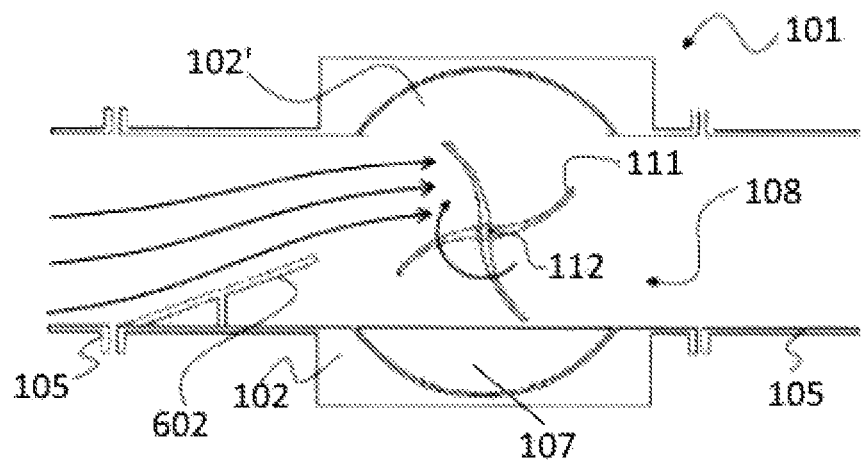
FIGS. 3, 4 and 5 schematically show a sectional side view, orthogonal to that of FIG. 1, of the first embodiment of the valve system for three different rotation angles of the obstructer, i.e. open, half-closed and closed.

The conformation of the obstructer 107 shows an outer contour (relative to the conformation of the housing 106 of the valve body) shaped as a spherical segment, so that, during the opening and closing movements, it will perfectly adhere to the inner edge of the housing 106 of the valve body 102. Preferably, the extension of the spherical segment is such as to ensure that the duct can be fully closed (FIG. 5), and such as to not interfere with the flow when fully open (FIG. 3).

The inner contour of the obstructer may have, for example, a linear shape as highlighted in FIGS. 3-8, but other shapes are possible as well.

Figure 12:
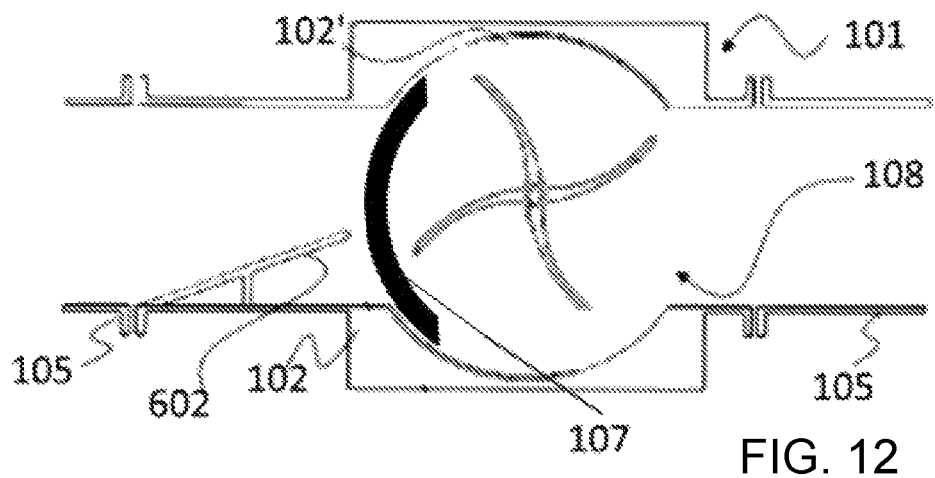
FIGS. 12, 13 and 14 show further embodiments of the obstructer of the control valve according to the present invention.
Figure 13:
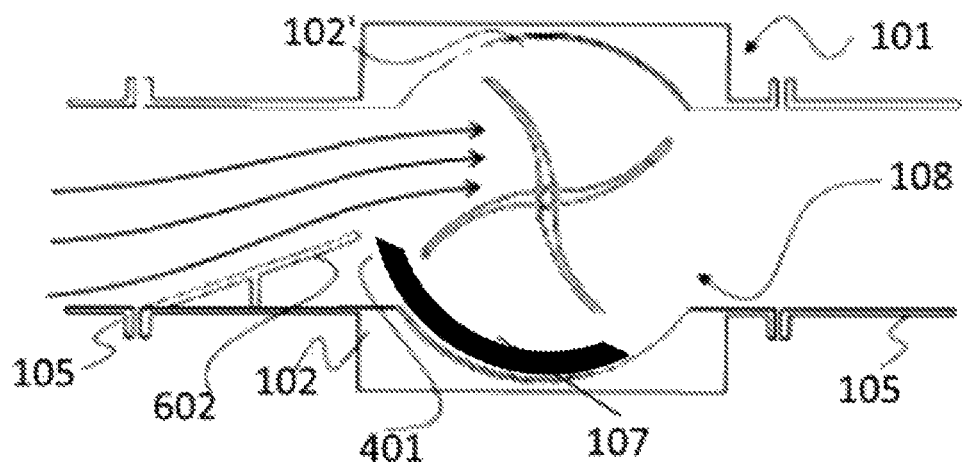
Figure 14:
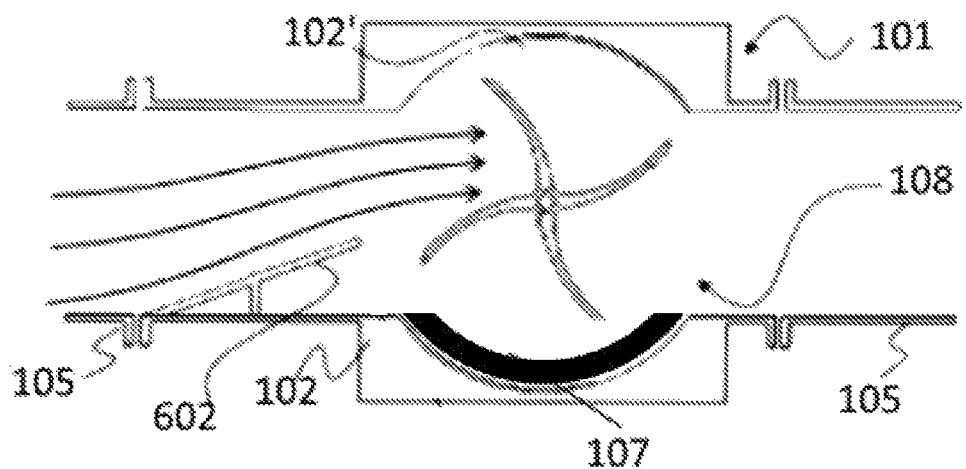

For example, with reference to FIGS. 12-14, the obstructer may also have its inner contour shaped as a spherical segment: this will make it possible to, among other things, increase the dimensions of the turbine and hence the efficiency of the energy recovery system.

The obstructer 107 is connected to an actuator 109 that controls the rotation thereof as it is partially or totally opened or closed. The actuator may be either a mechanical one, e.g. a knob operable by a user, or else a pneumatic or electromechanical one, and can be turned to align the through hole 108 with the axis of the valve 101 (thereby allowing the fluid to flow through) or to arrange the through hole 108 substantially transversal to the axis of the valve 101 (thereby substantially preventing the fluid from flowing through).

The coupling between the housing 106 and the spherical obstructer 107 is such as to ensure tightness when the obstructer is in the closed position, whether the fluid is a liquid, gas, steam or any other multi-phase fluid. In order to ensure such tightness, known elements and techniques can be used.

Therefore, the obstructer 107 is adapted to rotate about the axis 110.

The valve system 101 further comprises a rotor 111 placed inside the through hole 108 and fixed to a shaft 112, about which it is adapted to rotate. The shaft 112 is coaxial to the axis 110 or, in other embodiments described herein, at least substantially coaxial or parallel thereto, so that the obstructer 107 can be rotated in order to close the valve 101 without jeopardizing the operation of the rotor 111. The rotor 111 is, in fact, adapted to rotate under the action of the fluid flowing through the valve 101 as will be described more in detail hereinafter.

The shaft 112 has one end protruding from the spherical obstructer 107 and, in the non-limiting example of FIG. 1, also from the body of the valve 101. The protruding end of the shaft 112 is mechanically connected, or directly connected in the example of FIG. 1, to a user apparatus 114. The user apparatus 114 is adapted to use the mechanical power supplied by the shaft 112 due to the rotation of the rotor 111. In this example, the actuator 109 is positioned at the axis 110 on the side of the valve 101 opposite to the user apparatus 114.

The user apparatus 114 may therefore be an electric generator, or a mechanical apparatus such as, for example, a fan. The user apparatus 114 may further comprise known transmission couplings or reducers, not shown for the sake of simplicity.

Figure 2:
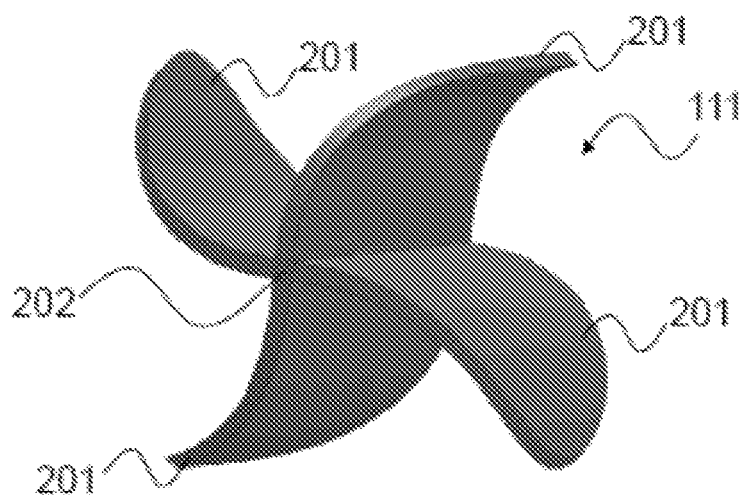
FIG. 2 shows a perspective view of a first embodiment of a rotor of the valve system according to the present invention.

FIG. 2 illustrates one possible embodiment of the rotor 111 fitted on the shaft 112. The rotor 111 is shaped substantially as a turbine and comprises four blades 201 which, under the action of the fluid flow through the valve 101, are adapted to rotate and produce a torque that will drive the shaft 112 of the rotor 111 itself.

In one embodiment, the rotor 111 comprises a through hole 202 along the axis of the rotor 111. Into this hole 202, which preferably has a cross-like section, the shaft 112 can be inserted, which preferably has one end hinged into a cavity 115 (see FIG. 1) of the spherical obstructer 107 and the other end projecting out of the valve 101 and connected to the above-described user apparatus 114.

As far as construction materials are concerned, criteria of good engineering practice should be adopted, by using known metallic alloys typically employed for common control valves, and by taking into account operating pressures and temperatures, the aggressiveness of the working environment, and the corrosiveness of the fluid.

It must be pointed out that a valve according to the present invention may be obtained by transforming a known ball valve, to which components like the rotor 111, the shaft 112 and the user apparatus 114 are added after proper machining. In particular, the exemplary embodiment of the rotor 111 illustrated herein with reference to FIG. 2 (i.e. wherein the shaft 112 is separate from the rotor 111) is particularly advantageous for transforming a ball valve, since the rotor 111 is adapted to be freely inserted into the through hole 108 and, therefore, the shaft 112 can subsequently be fitted into the hole of the spherical obstructer 107 along the axis 110, thus connecting the rotor 111 to the shaft 112 by means of the shaped hole 202.

FIG. 3 schematically shows a sectional side view of the valve system 101 in operating conditions. The obstructer 107 is shown herein in the fully open configuration, wherein the axis of the through hole 108 is coaxial to the axis of the valve 101, thus allowing the passage of the fluid.

Under the action of the flowing fluid (schematized in this and in the next figures as partial flow lines), the rotor 111 rotates, thereby rotatably driving the shaft 112.

Figure 4:
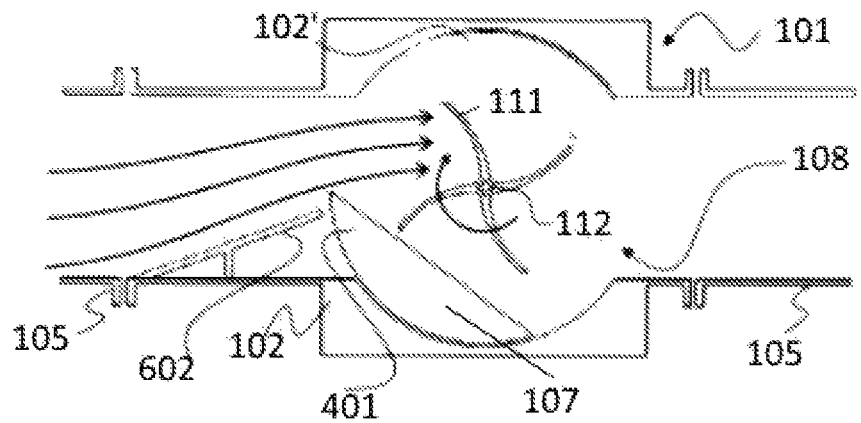

FIG. 4 schematically shows a sectional side view of the valve system in a partially open configuration, wherein the axis of the through hole 108 has been turned relative to the axis of the valve system 101 following a rotation of the obstructer 107, thus still allowing the fluid to pass, but at a lower flow rate. In fact, the edge 401 of the obstructer 107 affects the fluid flow, introducing a load loss that reduces the fluid flow rate.

Nevertheless, the rotor 111 keeps turning under the action of the flowing fluid. Even with the valve partially closed, therefore, power recovery is still possible thanks to the torque provided by the shaft 112. Moreover, by adjusting the resistant torque of the rotor 111 it is possible to improve the fluid flow adjustment even further.

Preferably, the blades of the rotor 111 are curved towards the fluid inlet direction, thus improving the efficiency and facilitating the starting of the rotor. Moreover, preferably, the blades of the rotor 111 are so sized as to occupy, for at least some rotation positions of the rotor 111 in the through hole 108, substantially the whole free section of the hole 108 itself without interfering with the motion of the obstructer.

Figure 5:
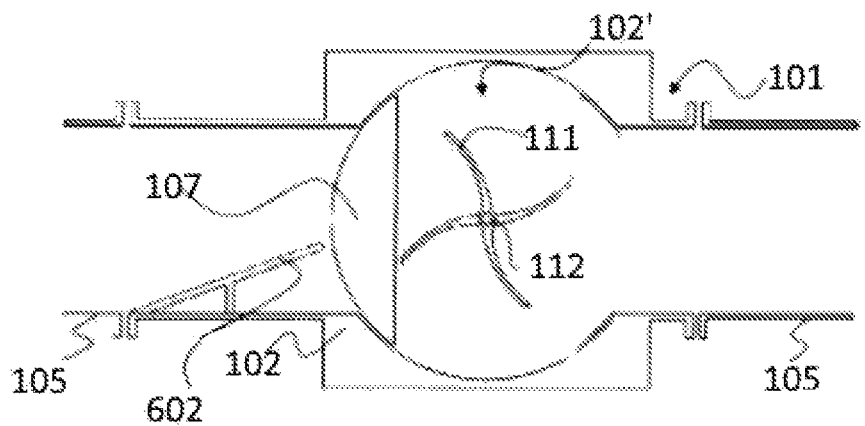
Figure 6:
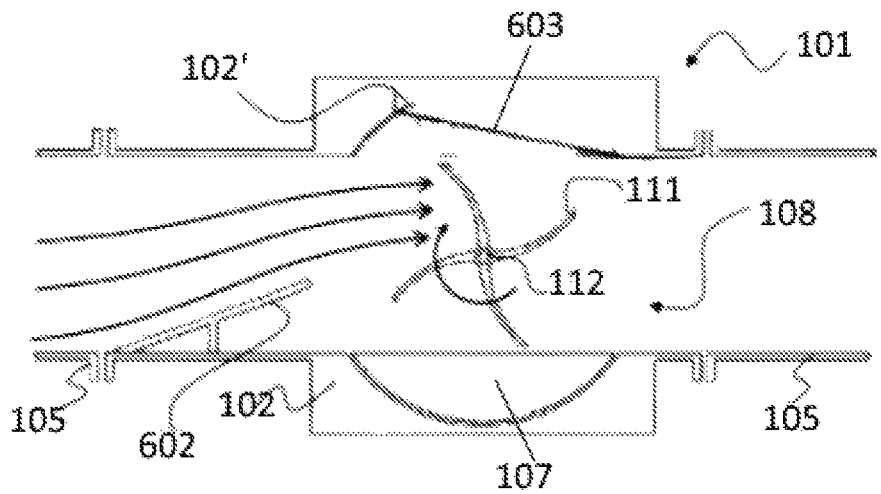
FIGS. 6, 7 and 8 schematically show a sectional side view, orthogonal to that of FIG. 1, of a second embodiment of the valve system for three different rotation angles of the obstructer, i.e. open, half-closed and closed.
Figure 7:
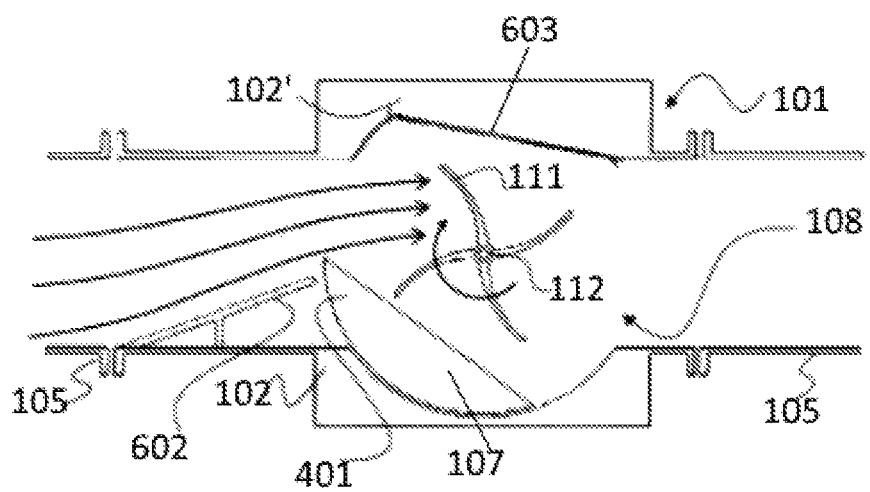
Figure 8:
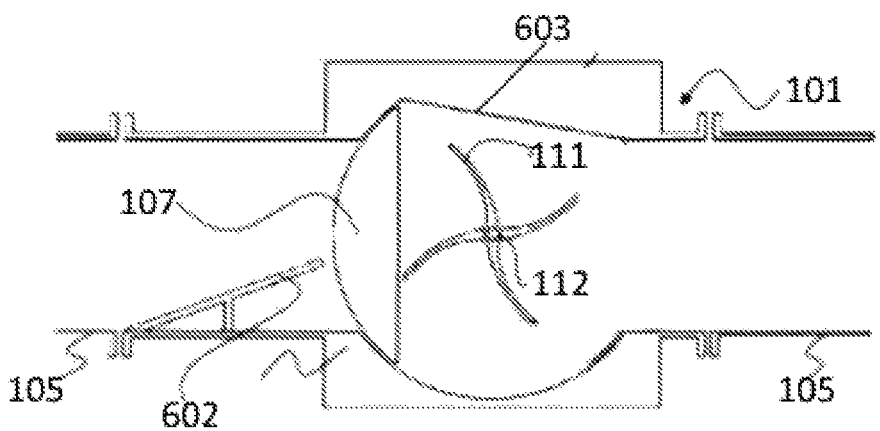

FIG. 5 schematically shows a sectional side view of the valve system in a closed configuration, wherein the axis of the through hole 108 has been turned by 90° relative to the axis of the valve 101 following a rotation of the obstructer 107, thus substantially preventing the fluid from flowing through the valve. Since no fluid can flow around the rotor 111, the latter will remain still and no power will be generated. In this configuration, the valve 101 permits closing the duct 105, thus effectively performing the same task as prior-art ball valves. In this regard, the presence of the rotor 111 will not adversely affect the dimensions and performance of the valve 101. As can be seen, the spherical segment of the obstructer 107 is at the front of the valve body with respect to the direction of the fluid flow.

The obstructer 107 is so positioned that it fills only one of the two lateral parts of the valve body 102, while the other lateral part 102' is empty. Therefore, the latter can be constructed in different ways to meet specific requirements, e.g. as described with reference to FIGS. 6-8. Those parts which are equal to those described with reference to FIGS. 3-5 will not be described any further.

According to this variant, since the obstructer has only one flow adjustment seat, the conformation of the free part of the valve body can be modified to obtain the best CV (flow coefficient) of the valve and make it usable in different conditions.

Figure 15:
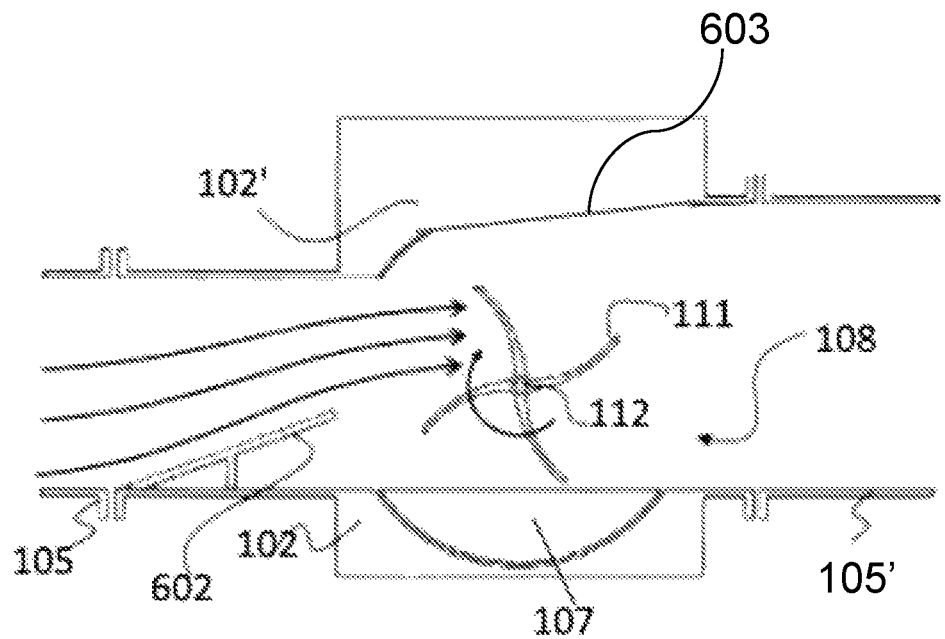
FIG. 15 represents a further possible conformation of the control valve according to the present invention.

Here, this free part 603 has a generic linear shape with a constant slope to join the downstream valve body, which has the same size as the pipe downstream and upstream of the valve body. This condition may be useful for applications with incompressible fluids, which do not tend to expand as pressure decreases. For compressible fluids, the fluid will expand downstream of the obstructer, at and downstream the turbine; in such cases, the particular conformation of the valve makes it possible to easily enlarge the terminal part of the valve body to allow the fluid to expand, so as to limit the velocity increase and connect the valve body to a downstream pipe 105' which is bigger than the upstream duct 105, see FIG. 15.

Figure 16:
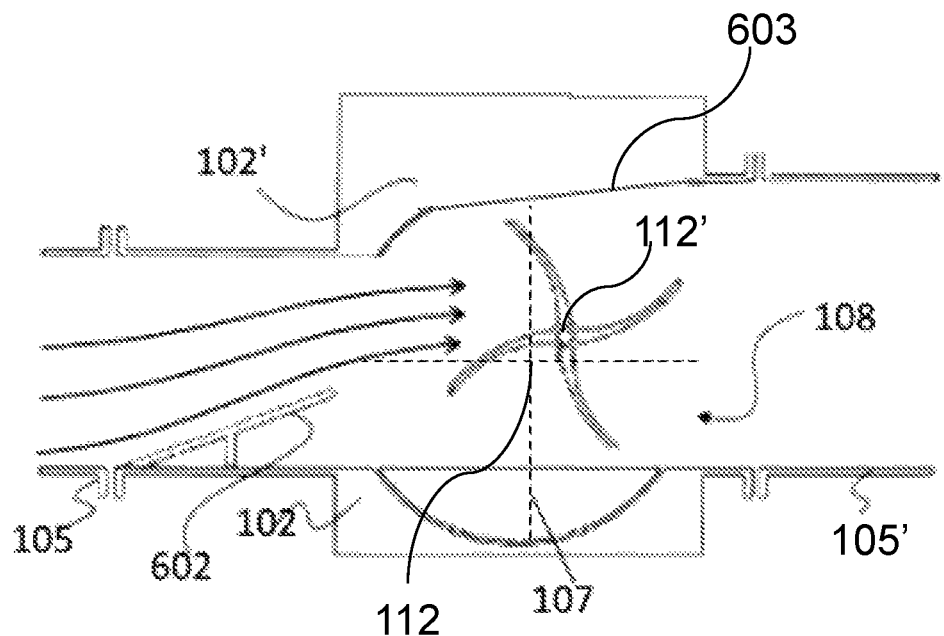
FIG. 16 represents a further possible position of the axis of rotation of the rotor of the control valve according to the present invention.

In this configuration, it is no longer necessary to keep concentrical with each other/on the same axis of rotation the obstructer actuation system and the turbine rotation axis. The latter (designated as 112') may be suitably moved downstream and offset to optimize the dimensions and position of the turbine (see FIG. 16).

In general terms, therefore, the other lateral part of the valve body, opposite to the part that comprises the obstructer, comprises an empty part at said outlet 104, and a joining part having a spherical-segment development 102' or a linear development (603) at the duct interruption.

According to further variant embodiments, a deflector 602 is positioned at the inlet of the valve body 102, i.e. upstream of the rotor 111 with respect to the direction of the fluid flow.

The deflector 602 improves the efficiency of the rotor 111 by directing the fluid flow towards the upper blades of the rotor 111, which will therefore be subjected to a greater thrust.

The deflector 602 may be a simple plate anchored and welded to a support, or it may have more aero-fluid-dynamically efficient shapes to avoid vein breaking.

Preferably, the deflector 602 is placed in a position such that it is asymmetrical relative to the axis of rotation of the rotor 111, i.e. in an asymmetric position in the cross-section of the valve body 102 with respect to the shaft 112, preferably in the open part of the obstructer 107.

The deflector 602 also allows the rotor 111 to be more easily set in motion when the valve is opened partially, by asymmetrically directing the fluid towards a blade of the rotor 111, thereby facilitating the starting thereof.

The deflector 602 contributes to avoiding any concentrated dissipation on the edge 401 of the obstructer 107, which would affect the fluid flow. Thus, by controlling in a more effective manner the load losses that reduce the fluid flow through the valve, it is possible to further improve the adjustment of the fluid flow.

A valve system according to the present invention may comprise a rotor made in accordance with different manufacturing solutions and having different shapes, which will essentially depend on the type of application of the valve itself.

The construction of the rotor will primarily depend on the type of fluid for which the valve is to be optimized, whether gas, liquid, steam or any other multi-phase fluid.

Such diversification is also related to specific liquid types, e.g. for liquids having different viscosity or density. For example, different characteristics, such as a higher flow coefficient, will be required from the valve for working with oil as opposed to water, so as to obtain an increased flow rate; also, the rotor blades will have to be self-cleaning.

Figure 9:
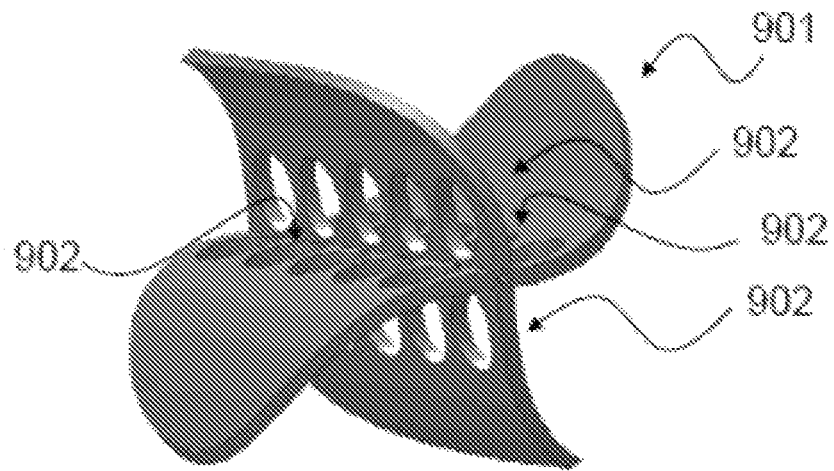
FIGS. 9, 10 and 11 show further embodiments of the rotor of the control valve according to the present invention.

FIG. 9 shows a further embodiment of a rotor 901 which may be used in a control valve according to the present invention. In this variant, the rotor 901 comprises four blades that, under the action of the fluid flowing through the valve, are adapted to rotate and produce a torque that will drive the shaft 112.

The rotor 901 comprises a plurality of holes 902, which increase the flow coefficient due to a larger flow surface, although to detriment of the efficiency of the turbine.

The holes 902 are preferably located in the proximity of the axis of rotation of the rotor 901, so that the outermost portions of the blades, i.e. where the lever arm is longest, will still be working, thus producing more power.

Other variants of the rotor are also conceivable, which essentially differ from one another in the number of blades.

Figure 10:
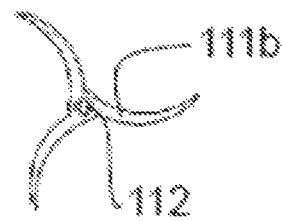

FIG. 10 schematically shows a valve 101b comprising a rotor 111b comprising three blades, which is preferably adapted for use with very viscous liquids.

Figure 11:
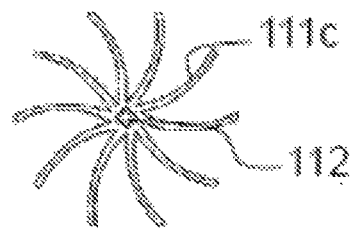

FIG. 11 schematically shows a valve 101c comprising a rotor 111c comprising ten blades, which is preferably adapted for use with gases.

In a preferred embodiment, as aforesaid, the blades of the rotor are curved towards the fluid inlet direction, so as to improve the efficiency and facilitate the starting of the rotor. The blades may alternatively be flat, e.g. should such choice be dictated by production cost requirements.

A valve system according to the present invention permits, therefore, recovering at least part of the energy dissipated by the fluid flowing therethrough; at the same time, it also essentially maintains the control capability which is typical of this valve type. The energy recovered will depend on the fluid-dynamic conditions in which the valve will have to operate, the valve opening angle, i.e. the angle of rotation of the valve obstructer, and the efficiency of the turbine, which in turn will depend on its shape.

A valve system according to the present invention also makes it possible to effectively exploit the turbine for most obstructer opening angles that allow fluid to flow through the valve.

Furthermore, unlike the above-mentioned international patent application WO2013/121375-A1, in this case, even in situations wherein higher efficiency is obtained if the axis of rotation of the rotor does not coincide with the axis of rotation of the obstructer, the introduction of the rotor does not require any substantial modification to the structure or principle of operation of the spherical-segment valve, while at the same time providing a compact, easy-to-manufacture device.

Preferably, the rotor comprises a shaft and a plurality of blades which are substantially transversal to the fluid flow and which are fixed to the shaft. This provides a highly efficient rotor having a simple construction.

Preferably, the blades are so sized as to occupy, for some rotation positions of the rotor, substantially the whole free cross-section of the valve body downstream of the spherical-segment obstructer.

Preferably, the blades comprise holes on their surface in order to decrease the dissipations occurring in the fluid flowing across the rotor and to improve the flow control accuracy.

Preferably, the control valve comprises a deflecting element positioned upstream of said rotor, which is adapted to fluid-dynamically interact with the fluid flow to improve the efficiency and facilitate the starting of the rotor.

Preferably, the deflecting element is positioned asymmetrically in the valve, at a cross-section defined by the axis of rotation of the valve.

Preferably, the valve can be associated with a mechanical user apparatus or an electric generator to transform the rotation of the rotor into usable energy. Thus, the valve provides a source of mechanical or electric energy that will be available even in remote or hardly accessible places, or anyway it can provide a power source in places where there are no electric grid wires.

The above-described non-limiting examples may be subject to further variations without however departing from the protection scope of the present invention, including all equivalent embodiments known to a person skilled in the art.

For example, many embodiments are conceivable for the rotor, depending on whether the valve system will have to prevalently operate in fully open or partially open conditions, with compressible or incompressible fluids; it is also possible to optimize the shape and construction of the various elements of the valve (diameter of the hole in the obstructer, valve body inlet and outlet diameters, dimensions and shape of the valve body, etc.) based on the prevalent operating conditions of the valve itself.

It is also conceivable to position the actuator 109 on the same side of the valve 101 where the user apparatus 114 is located; this embodiment, although it requires a more complex construction (e.g. the actuator may require the presence of a hole through the shaft 112), may be used when suggested by considerations about the outer dimensions of the valve itself.

The elements and features shown in the various preferred embodiments may be combined together without however departing from the protection scope of the present invention.

From the above description, those skilled in the art will be able to produce the object of the invention without introducing any further construction details.

The invention claimed is:

1. A valve system for controlling a fluid flow in a duct, comprising:
    a substantially hollow valve body provided with an inlet and an outlet which allow a flow of a fluid in said valve body, said valve body houses an obstructer rotatable, about an axis of rotation, between:
    a first position, in which said valve system is closed, wherein said obstructer stops the flow of the fluid from passing between the inlet and the outlet of the valve body; and
    a second position, in which said valve system is partially or totally open, wherein said obstructer allows the flow of the fluid to pass between the inlet and the outlet of said valve body;
    an actuator adapted to rotate said obstructer between said first position and said second position;
    a rotor shaped substantially as a turbine, placed inside the valve body and provided with a rotation shaft, the rotation shaft being spaced apart from and parallel with respect to the axis of rotation of the obstructer, said rotor being adapted to be rotated by said flow of the fluid;

wherein said valve body further comprises:

a housing, arranged on a first lateral portion of the valve body and having a first recess in a configuration of a spherical segment; and a second recess disposed on a second lateral portion of the valve body, the second recess facing toward and being opposite to the first recess, wherein said obstructer has a spherical-segment outer contour which, in said second position, adheres to an inner edge of the housing of the valve body;

wherein, in the first position, the spherical-segment outer contour of the obstructer is upstream of the axis of rotation with respect to a direction of the flow of the fluid;

wherein, in the second position, (i) the spherical-segment outer contour of the obstructer is at least partially disposed within the first recess, and (ii) the obstructer does not occupy, either entirely or partially, the second recess, wherein the second recess has a configuration different from the first recess so that a spacing between the first recess and the second recess toward the outlet is greater than a spacing between the first recess and the second recess toward the inlet, wherein said outlet has a cross section that is larger than a cross section of said inlet.

2. The valve system for controlling the fluid flow in a duct as in claim 1, wherein a portion of said second recess has a substantially linear shape with a constant slope that joins to said outlet.

3. The valve system for controlling the fluid flow in a duct as in claim 1, wherein said rotation shaft of the rotor comes out of said valve body and is connected to a user apparatus utilizing a rotation energy of the rotor during operation.

4. The valve system for controlling the fluid flow in a duct as in claim 1, wherein said rotor comprises a plurality of blades substantially transversal to the flow of said fluid and being fixed to said rotation shaft.

5. The valve system for controlling the fluid flow in a duct as in claim 4, wherein said blades are curved towards said inlet of the valve body.

6. The valve system for controlling a fluid flow in a duct as in claim 1, further comprising a deflecting element positioned upstream of said rotor and adapted to fluid-dynamically interact with the flow of said fluid.

7. The valve system for controlling the fluid flow in a duct as in claim 6, wherein said deflecting element is positioned asymmetrically relative to said rotation shaft.

8. The valve system for controlling the fluid flow in a duct as in claim 1, wherein said axis of rotation is substantially transversal to said flow of said fluid through said valve body.

9. The valve system for controlling the fluid flow in a duct as in claim 1, wherein, in the first position, the spherical-segment outer contour of the obstructer is at least partially disposed within the second recess.

10. The valve system for controlling the fluid flow in a duct as in claim 1, wherein, in the first position, the obstructer stops the flow of the fluid from passing between the inlet and the rotor but there is no blocking passing of the flow of the fluid from the rotor to the outlet.

11. The valve system for controlling the fluid flow in a duct as in claim 1, wherein, in said first position, the obstructer entirely closes said inlet and does not obstruct said outlet, wherein, in said second position, the obstructer leaves at least partially open said inlet and does not obstruct said outlet.

12. The valve system for controlling the fluid flow in a duct as in claim 1, wherein the valve body bounds a fluid passage through which the fluid passes as the fluid travels from the inlet to the outlet, the first recess and the second recess being disposed on opposing sides of the fluid passage.

13. The valve system for controlling the fluid flow in a duct as in claim 1, wherein when viewed in a plane that is normal to the axis of rotation of the obstructor and that centrally passes through the inlet and the outlet, the first recess has a first outer perimeter edge having a constant radius from the axis of rotation of the obstructor as the first outer perimeter edges extends from toward the inlet to toward the outlet and the second recess has a second outer perimeter edge having a radius from the axis of rotation of the obstructor that constantly flares radially outward as the second outer perimeter edge extends from toward the inlet to toward the outlet.

* * * * *